(No Model.)
G. E. MEEKER & E. R. FISHER.
BLACKING BOX HOLDER.
No. 353,571. Patented Nov. 30, 1886.
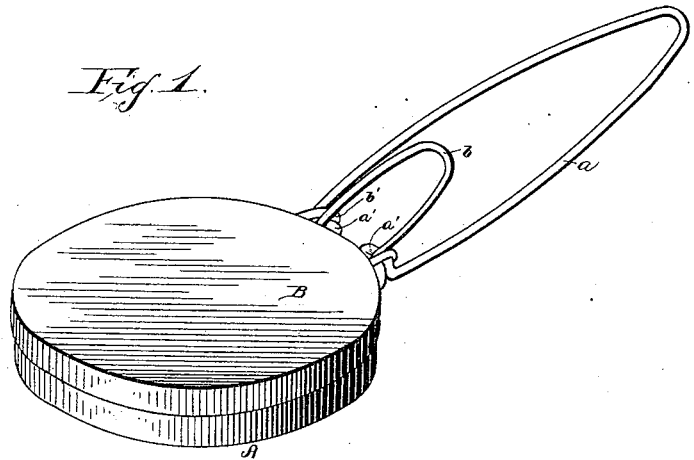
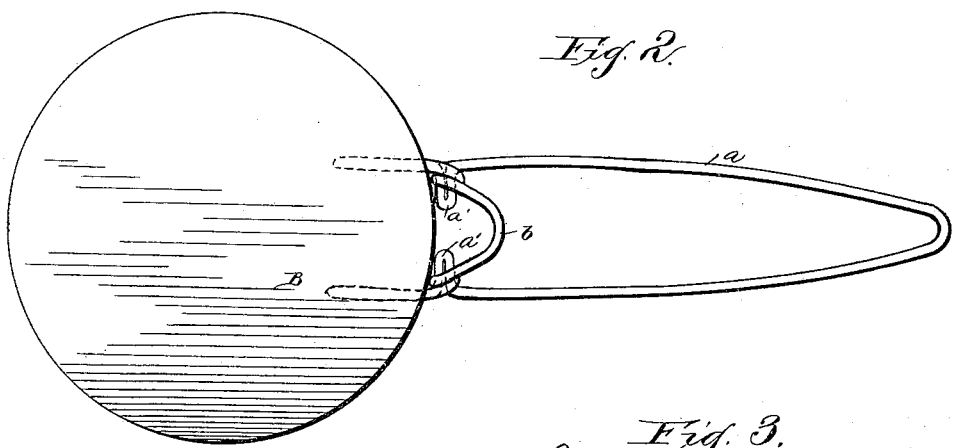
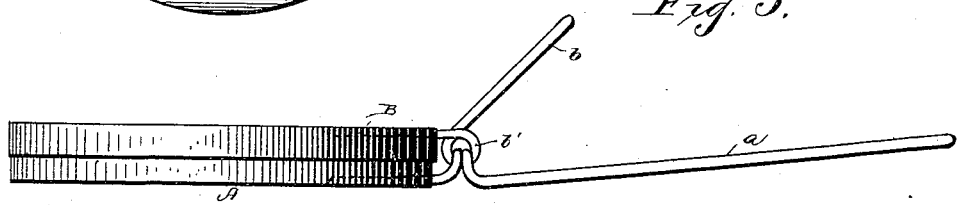

UNITED STATES PATENT OFFICE.

GEORGE E. MEEKER AND ELIAS R. FISHER, OF MERIDEN, CONNECTICUT.

BLACKING-BOX HOLDER.

SPECIFICATION forming part of Letters Patent No. 353,571, dated November 30, 1886.

Application filed September 15, 1886. Serial No. 213,620. (No model.)

*To all whom it may concern:*

Be it known that we, GEORGE E. MEEKER and ELIAS R. FISHER, citizens of the United States of America, residing at Meriden, in the county of New Haven and State of Connecticut, have invented certain new and useful Improvements in Blacking-Box Holders, of which the following is a specification, reference being had therein to the accompanying drawings.

This invention pertains to certain new and useful improvements in blacking-box holders; and it consists in the detailed construction, combination, and arrangement of the parts, substantially as hereinafter fully set forth, and particularly pointed out in the claim.

In the accompanying drawings, Figure 1 is a view in perspective of our invention. Fig. 2 is a plan view thereof, and Fig. 3 is a side elevation.

In carrying out our invention we employ an ordinary blacking-box, A, to which, at its lower portion, we rigidly secure the inner ends of a handle, $a$, which handle projects out from said box a suitable distance for the convenient holding of the same. The opposite side bars of this handle are each bent at right angles at a point immediately adjacent the box A, which bent portions are again bent inwardly at right angles in an approximately U shape, forming projections or arms $a'$, the purpose of which will appear farther on.

B is the lid or cover, designed to fit snugly over and around the box A, and to this lid or cover are connected the inner ends of a second smaller handle or tongue, $b$, which have eyes or loop portions $b'$ formed in each side piece thereof. Said eyes or loop portions are designed to be inserted upon the projections or arms $a'$, which serve as a hinge for said lid or cover. The small handle or tongue, after being bent in the formation of the eyes or loops, is extended rearwardly in an upward direction, and from this it will be seen that by placing the handle $a$ in one hand the lid or cover can be raised or the box opened by pressing on the small handle or tongue with the thumb of the same hand.

By the employment of my invention the hands of the person performing the blacking operation are not liable to be soiled; and, further, the lid or cover cannot be lost or misplaced, thus preventing the detrimental effect consequent upon the blacking being exposed when uncovered.

We are aware that it is not new to construct a blacking-box holder of a bent handle having loops formed in close proximity to the box and securing the ends of said handle on the outer surface of the box, and a tongue provided with vertical portions secured to the side of the lid or cover and having right-angular portions secured in said loops; but our invention is designed as an improvement over such a device, and to this end we form U-shaped projections or arms on the handle, and eyes or loops on the tongue passed on said projections or arms. Further, the ends of the handle and tongue in our invention are secured on the inside of the box and cover, respectively, thereby providing against the liability of the accidental breaking off of such handle and tongue, as in the device above outlined.

Having thus fully described our invention, what we claim, and desire to secure by Letters Patent, is—

The combination, with the box and the lid, of the handle having its ends secured in and to said box, and provided with U-shaped arms, and the tongue having its ends secured on the inside of said lid and having looped portions passed on said arms, substantially as shown and described.

In testimony whereof we affix our signatures in presence of two witnesses.

GEORGE E. MEEKER.
ELIAS R. FISHER.

Witnesses:
A. L. STEVENS,
F. A. STEVENS.